May 25, 1937.   G. J. TRAPP   2,081,391
CAM FOLLOWER
Original Filed Feb. 17, 1936
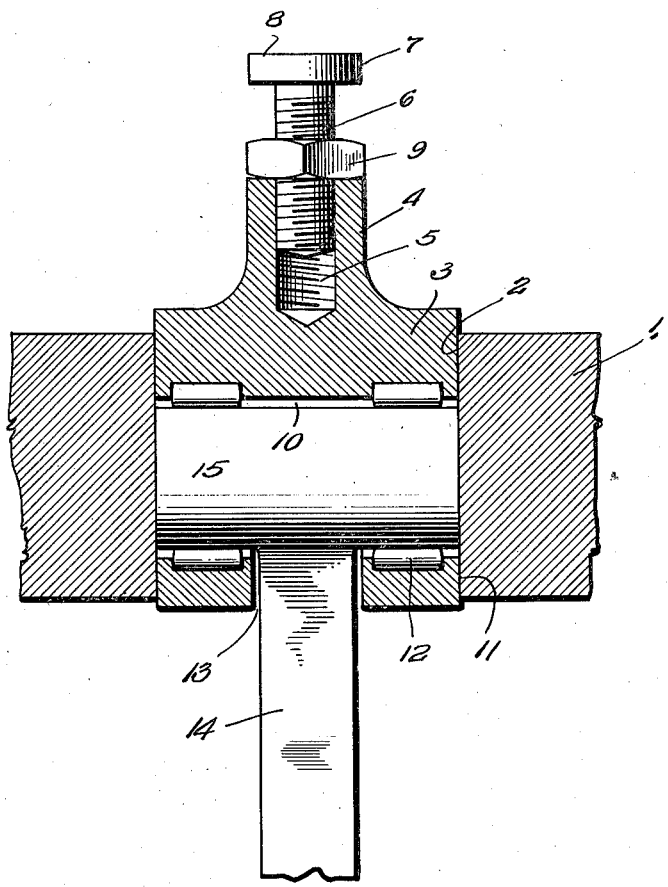
Inventor
George Joseph Trapp.
By Lacey & Lacey, Attorneys Patented May 25, 1937

2,081,391

UNITED STATES PATENT OFFICE 2,081,391

CAM FOLLOWER

George Joseph Trapp, Merton Park, London, England, assignor to Automotive Products Company Limited, London, England Original application February 17, 1936, Serial No. 64,377. Divided and this application January 21, 1937, Serial No. 121,646. In Great Britain October 31, 1934

1 Claim. (Cl. 74—569)

This invention relates to a cam follower of the general class described in my application Serial No. 64,377, filed February 17, 1936, of which this is a division.

The invention seeks, among other objects, to provide a cam follower which will be of rugged construction, so that it will be capable of handling the relatively heavy duty work imposed upon devices of this class.

A further object of the invention is to provide a cam follower wherein means are employed for resisting lateral thrusts normally produced by the cam and wherein relative torsional movement of the parts will be prevented.

And a further object of the invention is to provide a device of this nature which will be characterized by the utmost simplicity and which may be manufactured with ease and at a low cost.

Other and incidental objects of the invention not specifically mentioned hereinabove will become apparent as the description of the invention proceeds.

Referring now to the drawing forming a part of this application:

The figure of the drawing is a vertical sectional view of my improved cam follower.

Referring now to the accompanying sheet of drawing, the numeral 1 indicates a guide which may be of any suitable construction and which has a rectangular opening 2 therein. The guide is adapted to receive slidably therein a rectangular block 3 having integrally formed therein a normally upstanding sleeve 4 which is formed with an internally threaded socket 5. The socket 5 is adapted to have screwed therein a bolt 6 which is formed with a head 7 having a flattened upper surface 8. The flattened upper surface 8 is adapted for engagement with a push rod for causing vertical movement thereof. The device may be adapted for use with any suitable engine or pump and, by way of example, the device could conveniently be used with the plunger of a fuel injection pump. A lock nut 9 is carried on the bolt 6 and is adapted to be tightened against the upper surface of the sleeve 4 for the purpose of locking the bolt 6 in a suitable adjusted position. The block 3 is provided, substantially medially of its height, with a relatively large laterally extending opening 10 which extends throughout the length of the block. Formed in the opening 10, near each end thereof, are annular relatively narrow bearing or roller races 11 adapted rotatably to receive therein roller bearings 12 which, in accordance with usual custom, are arranged in an annular series. The block 3 is provided at its lower side and medially of its length with a slot 13 which extends at right angles to the length of the block and leads from the exterior of the block to the opening 10. The slot 13 is relatively long and is wide enough to freely receive therein the operating surface of a cam 14.

There is rotatably mounted in the block 3 a roller 15 adapted to have its end portions journaled by the roller bearings 12 and its ends flush with the ends of the block 3 and in abutting sliding relationship to the inner confronting surface of the guide 1. The roller 15 is of uniform diameter throughout its length and is adapted to freely rotate within the opening 10 of the block 3. As will be seen by referring to the drawing, the roller will be engaged by the operating surface of the cam so that as said cam rotates, the roller will be caused to rotate and, at the same time, the block 3 will be shifted vertically within the guide 1.

From the foregoing, it will be understood that by the use of my improved cam follower, the presence of a sliding contact between the operating surface of the cam and the block 3 will be eliminated so that wear, which would be caused by such sliding contact, will be eliminated. Greater loads may thus be imposed upon the cam 14 and block 3 without impairment of any of the parts. In view of the fact that the roller 15 is of uniform diameter throughout its length, the manufacture thereof will be greatly simplified.

From the foregoing, it wil be readily understood that the device will be simple in construction and highly efficient in operation so that by the use thereof, wear upon the cam and push rod connections of engines and pumps will be reduced to a minimum.

Having thus described the invention, what I claim is:

In a cam follower, a guide having an opening, a rectangular block vertically slidable in the opening and having a laterally disposed cylindrical opening extending throughout its length, a bearing race formed in the second mentioned opening near each end thereof, roller bearings arranged in a circumferential series in each of the bearing races, said block being formed with a slot at its lower side medially of its length and a sleeve and a bolt at its upper side, and a roller mounted rotatably within the rectangular block in the second mentioned opening and having its opposite end portions journaled by the bearings, said roller being of uniform diameter throughout its length and being adapted for engagement by the operating surface of a cam which extends through the slot whereby a roller connection between the cam and the block, with consequent lack of wear, will be provided, said bolt providing means for engagement with a push rod for actuating said push rod as the block moves within the guide.

GEORGE JOSEPH TRAPP.